US 6,675,682 B2

(12) United States Patent  (10) Patent No.: US 6,675,682 B2
Song  (45) Date of Patent: Jan. 13, 2004

(54) CUTTING APPARATUS AND AUTOMATIC CUTTING SYSTEM OF BLADE'S RAW MATERIAL OF BLANKING DIE

(76) Inventor: Byung-Jun Song, 1209-1404, Jukong Apt., 449-6, Chulsan-dong, Kwangmyung-city, Kyungki-do (KR)

(*) Notice: Subject to any disclaimer, the term of this patent is extended or adjusted under 35 U.S.C. 154(b) by 9 days.

(21) Appl. No.: 09/982,319

(22) Filed: Oct. 18, 2001

(65) Prior Publication Data

US 2002/0023950 A1 Feb. 28, 2002

Related U.S. Application Data

(63) Continuation of application No. 09/063,755, filed on Apr. 21, 1998, now Pat. No. 6,324,950, which is a continuation of application No. 08/698,758, filed on Aug. 16, 1996, now Pat. No. 5,749,276, which is a continuation of application No. 08/480,702, filed on Jun. 7, 1995, now abandoned, which is a continuation of application No. 08/090,080, filed as application No. PCT/KR92/00074 on Dec. 10, 1992, now abandoned.

(51) Int. Cl.[7] .................................................. B26D 5/20
(52) U.S. Cl. ........................ 83/76.9; 83/549; 83/551; 234/116
(58) Field of Search ........................ 83/76.9, 549, 551, 83/555; 234/111, 116, 117

(56) References Cited

U.S. PATENT DOCUMENTS

| 4,091,700 A | * | 5/1978 | Cloup .......................... 83/549 |
| 4,168,644 A | * | 9/1979 | Leibinger et al. ............. 83/573 |
| 4,267,758 A | * | 5/1981 | Muhr et al. ................... 83/571 |
| 4,475,424 A | * | 10/1984 | Kouno et al. ................. 83/549 |
| 4,562,754 A | * | 1/1986 | Archer et al. ............... 76/107.8 |
| 4,623,089 A | * | 11/1986 | Scott .......................... 234/116 |
| 4,773,284 A | * | 9/1988 | Archer et al. ................... 76/4 |
| 5,125,250 A | * | 6/1992 | Sun ............................. 83/288 |
| 6,324,950 B1 | * | 12/2001 | Song .......................... 83/76.9 |

FOREIGN PATENT DOCUMENTS

| DE | 1502721 | * | 1/1970 |
| DE | 3832215 | * | 3/1990 |
| FR | 2450422 | * | 8/1984 |
| WO | 8501896 | * | 5/1985 |

* cited by examiner

*Primary Examiner*—Jack A. Lane
(74) *Attorney, Agent, or Firm*—F. Chau & Associates, LLP (57) ABSTRACT

A cutting apparatus of blade's raw material used in a paper blanking die for manufacturing paper box and the like and an automatic cutting system using this cutting apparatus. This cutting apparatus comprises: cutters more than two kinds having different cutting out or cutting off patterns arranged side by side laterally against a feeding direction of the blade's raw material; a cutter guiding section for guiding said each cutter so as to be able to perpendicularly move against a plane of said blade's raw material; a pressing means for perpendicularly moving and pressing any one of the cutters toward a plane of said blade's raw material; a cutter die for supporting said blade's raw material against the pressing force of said cutter and simultaneously interacting with said cutter whereby executing the cutting work of the blade's raw material; and a cutter selecting means for selecting such that only any one of said cutters is pressed by said pressing means. According to this, various cut patterns of the blade's raw material can be easily and exactly obtained in a single apparatus. And, complete automatization of the cutting work is attained by the automatic cutting system.

4 Claims, 6 Drawing Sheets

CUTTING APPARATUS AND AUTOMATIC CUTTING SYSTEM OF BLADE'S RAW MATERIAL OF BLANKING DIE

CROSS-REFERENCE TO RELATED APPLICATIONS

This is a continuation of U.S. application Ser. No. 09/063,755, filed Apr. 21, 1998, which is now U.S. Pat. No. 6,324,950, which is a continuation of U.S. application Ser. No. 08/698,758, filed Aug. 16, 1996, which is now U.S. Pat. No. 5,749,276, which is a continuation of U.S. application Ser. No. 08/480,702, filed Jun. 7, 1995, which is abandoned, which is a continuation of U.S. application Ser. No. 08/090,080, filed Jul. 21, 1993, which is abandoned, which is a 371 Application of PCT/KR92/00074, filed Dec. 10, 1992, which claims priority to Korean Application Nos. 91-22620, filed Dec. 11, 1991 and 91-23178, filed Dec. 17, 1991.

TECHNICAL FIELD

The present invention relates to a cutting apparatus of blade's raw material used for a paper blanking die for manufacturing paper box and the like and an automatic cutting system employing this cutting apparatus, and more particulaly to a multi-purpose cutting apparatus capable of obtaining various cutting patterns in a single system and an automatic cutting system thereof.

BACKGROUND ART

The blanking die used for cutting out and forming a paper pattern for manufacturing a paper box and the like consists of a board made of a plate material of wood and the like, and a multiplicity of blades, i.e., so called Thomson blade, to be inserted along a plane outline of a desiring paper box on the board. The blade's raw material is a plate material of band shape, on which blade portion(s) of a single blade at its one side or double blades at both sides are formed, and which passes through a number of cutting and bending operations and thereafter it is fixed by insering into pierced groove formed with a predetermined plane form by a laser process on the board such that said blade portion(s) are protruded with a predetermined height. And, the cut area shape of the blade's raw material may either have a lip shape directed to inward or outward in accordance with the requirement, or a notch or bridge cutting which cuts off as much as a predetermined width is also carried out.

Heretofore, in order to obtain various cut pattern in one blade's raw material as above, a cutting apparatus as much as the number required to the cutters corresponding to its cutting patterns had to be prepared and then the work had to be done by moving these in turn, or the work has to be done by continuously changing the cutter at one cutting apparatus. A multi-prupose cutting apparatus has been known which has been provided with a plurality of cutters for such as straight line cutting, lip cutting or bridge cutting in radial form to a rotatable supporting means, and then carried out a desired cutting work by rotating one cutter of them to a working position.

However, even in this multi-purpose cutting apparatus, in order to work by changing to other different cutter, once cut blade has to be removed from a working position and then a cutter fixing means which has been fixed has to be released and thereafter a work has to be carried out with the changed cutter. Accordingly, there has been a disadvantage that in case where various cutters have to be used, the work had to be frequently stopped and then the cutter had to be changed.

And, in manufacturing a blanking die, a precision and automatized manufacturing of the blanking die has been proceeded up to a considarable level, by designing a plane pattern of desired paper pattern at CAD and by working a pierced groove of the board by using a laser processor on the basis of the prepared CAD design data.

However, in a field for cutting and bending the blade raw material to be inserted by, fitting in the pattern to the pierced groove of the blanking die formed by an automatized system such as laser processor, the automation is stil inadequate in many parts and substantially it depends on a skill of an operator. As an atempt for the automation of the cutting work, heretofore various systems have been offered, but an automatized system capable of continuously obtaining various cutting patterns in a single equipment has not been yet developed.

DISCLOSURE OF THE INVENTION

Accordingly, it is an object of the present invention to solve the problems of such conventional blade's raw material cutting apparatus as above, and to provide a multi-purpose cutting apparatus capable of continuously executing the cutting work of various patterns without frequent changing of cutters in a single apparatus.

Another object of the present invention is to provide a multi-purpose cutting apparatus capable of automatically working by cutting the blade's raw material to various cutting patterns on the basis of an inputted data from a CAD system and the like.

In order to attain above objects, the multi-purpose cutting apparatus of blade for die cutting in accordance with the present invention comprises: cutters of more than two kinds having mutually different cutting out or cutting off patterns arranged side by side in lateral to a feeding direction of the blade's raw material; a cutter guiding section for guiding each cutter so as to be able to perpendicularly move against a plane of said blade's raw material; pressing means for perpendicularly moving and pressing any one of said cutters toward the plane of said blade's raw material; a cutter die for supporting said blade's raw material against the pressing force of said cutter and simultaneously executing a cutting work of the blade's raw material by interacting with said cutter; and cutter selecting means for selecting such that only any one of said cutters is pressed by said pressing means. Here, each cutter is made so as to be moved to return resiliently by a spring, so that a returning of the cutter can be simply made.

And, the cutter selecting means preferably includes: a hydraulic pressure member which is placed between the pressing means and said each cutter and makes such that a cutting work by the cutter can be done by transfering a pressing force of said pressing means to a corresponding cutter; hydraulic pressure member driving means for selectively moving said each hydraulic member to any one position among said pressing force transferable position and a position which does not transfer the pressing force so as to make the cutting work to be impossible; and control means for controlling said hydraulic pressure member driving means. And, said hydraulic pressure member driving means further preferably includes a fluid pressure cylinder such as an air cylinder which is fixedly attached to said each cutter and for forwardly or backwardly moving said corresponding hydraulic pressure member perpendicularly to the pressing direction of said pressing member. Control means of said hydraulic pressure driving means includes selection switching means for selectively driving each correspondinbg hydraulic pressure member driving means of said cutters, so that the selection switching operation can be easily executed. It is advantageous to make the hydraulic pressure member to be moved to forward and backward on the hydraulic plane of said each cutter.

In relation to the different working position of said each cutter, it is desirable to include means for controlling a cutting position of the blade's raw material, for instance, a correcting and comlementing scale rules so as to easily compensate a feeding quantity of the blade's raw material and to be able to execute the cutting work.

Other than the cutter for cutting work of the blade's raw materal, it is desirable to include cutting-off cutters for various notch processing, in order to form a thin and long notch for reducing a working or bending force of the bridge portion, or to form a marking for indicating a bending position in a bending machine. Particularly, the bending can be easily executed at a exact position in a post bending work by a marking cutter capable of exactly forming the bending posotion;

In order to accomplish the multi-purpose automatic cutting of the blade's raw material, in a blade's raw material automatic cutting system including said cutting apparatus for cutting out or working by cutting off of the blade's raw material for a blanking die; the invention provides a blade's raw material automatic cutting system comprising: a blade's raw material feeding device for feeding in measuring way the blade's raw material to be cut out and worked to said cutting device; working data inputting means for inputting the data with regard to kinds of cutting work to execute a working by cutting out or cutting off to the blade's raw material and a position of working by cutting out or cutting off, a bending position and a bending condition; and a control device for controlling said cutting device and the blade's raw material feeding means on the basis of said inputted working data.

Here, said blade's raw material feeding means may include a pair of feeding rollers for resiliently pressing and contacting by placing the blade's raw material to between them, and a driving motor for rotatably driving said feeding rollers in measuring way. And, said working data inputting means includes data converting means which receives a pattern designing data of paper patterns to be cut off by a blade or a laser working data of paper box blanking die whereby converts into said data for working by cutting, so that the data made at CAD and the like can be directly utilized to the cutting work of the blade's raw material. And, said control means includes a material property data memory for storing a material property data of the blade's raw material such as an expansion coefficient data of the blade's raw material in accordance with the bending condition, and the position of working by cutting out or cutting off or a bending position in response to said inputted working data is compensated on the basis of said data stored to the material property data memory, so that some operation error of material cutting and bending or a loss of the material are reduced and a desired cutting and bending work can be carried out at an exact position.

BRIEF DESCRIPTION OF THE DRAWINGS

FIG. 3 is a magnified schematic drawing of a cutter assembly, FIGS. 4Aa–4Fc are diagrams of front view and bottom view of examples of the blade's raw material used to the cutting apparatus of the present invention and shapes of the blade which are cut and worked by them.

BEST MODE FOR CARRYING OUT THE INVENTION

Hereinafter, a preferred embodiment of the present invention will be described in more detail with reference to the accompanying drawings.

Figure 1:
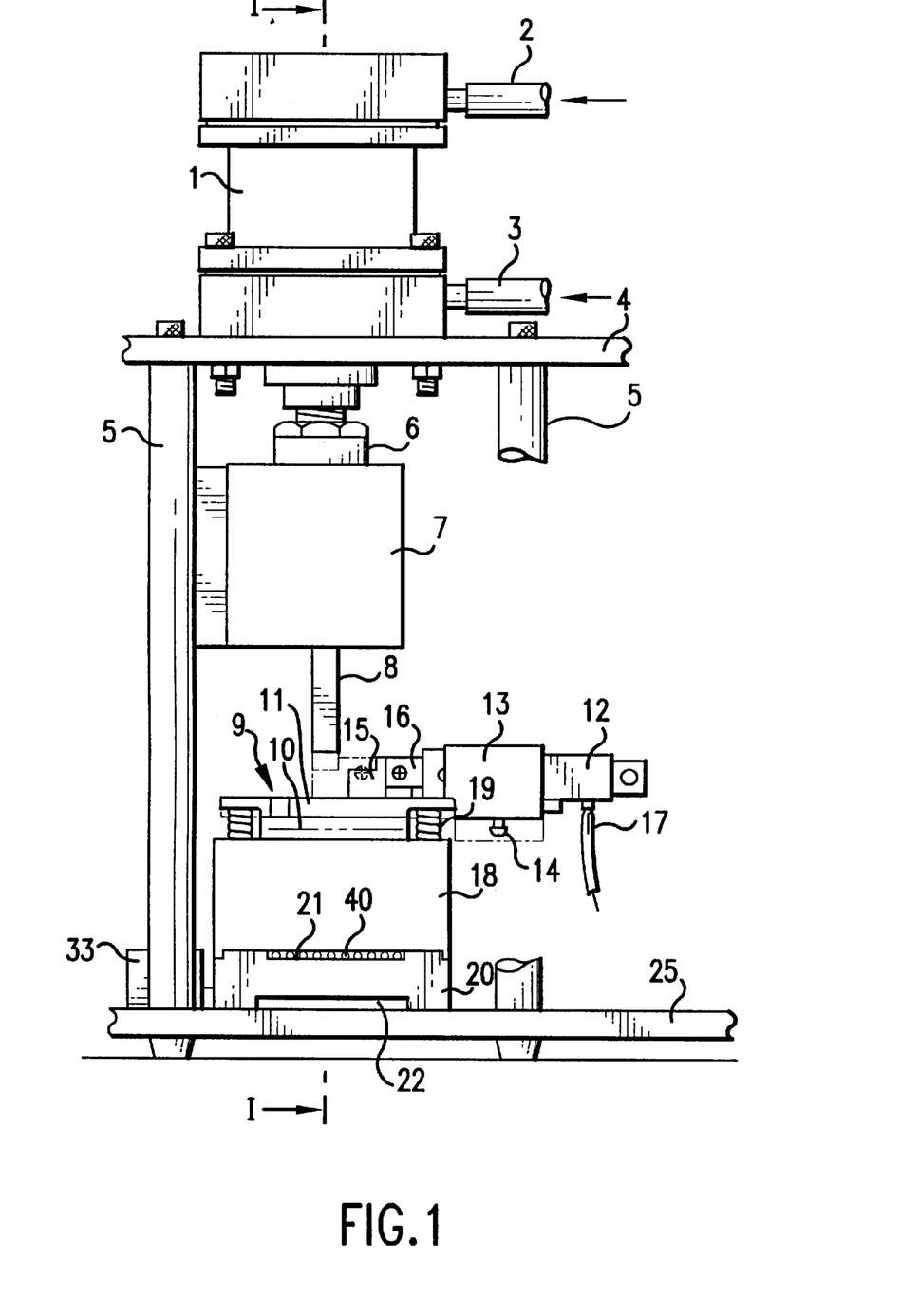
FIG. 1 is a front elevational view of a blade's raw material cutting apparatus in accordance with the present invention.
Figure 2:
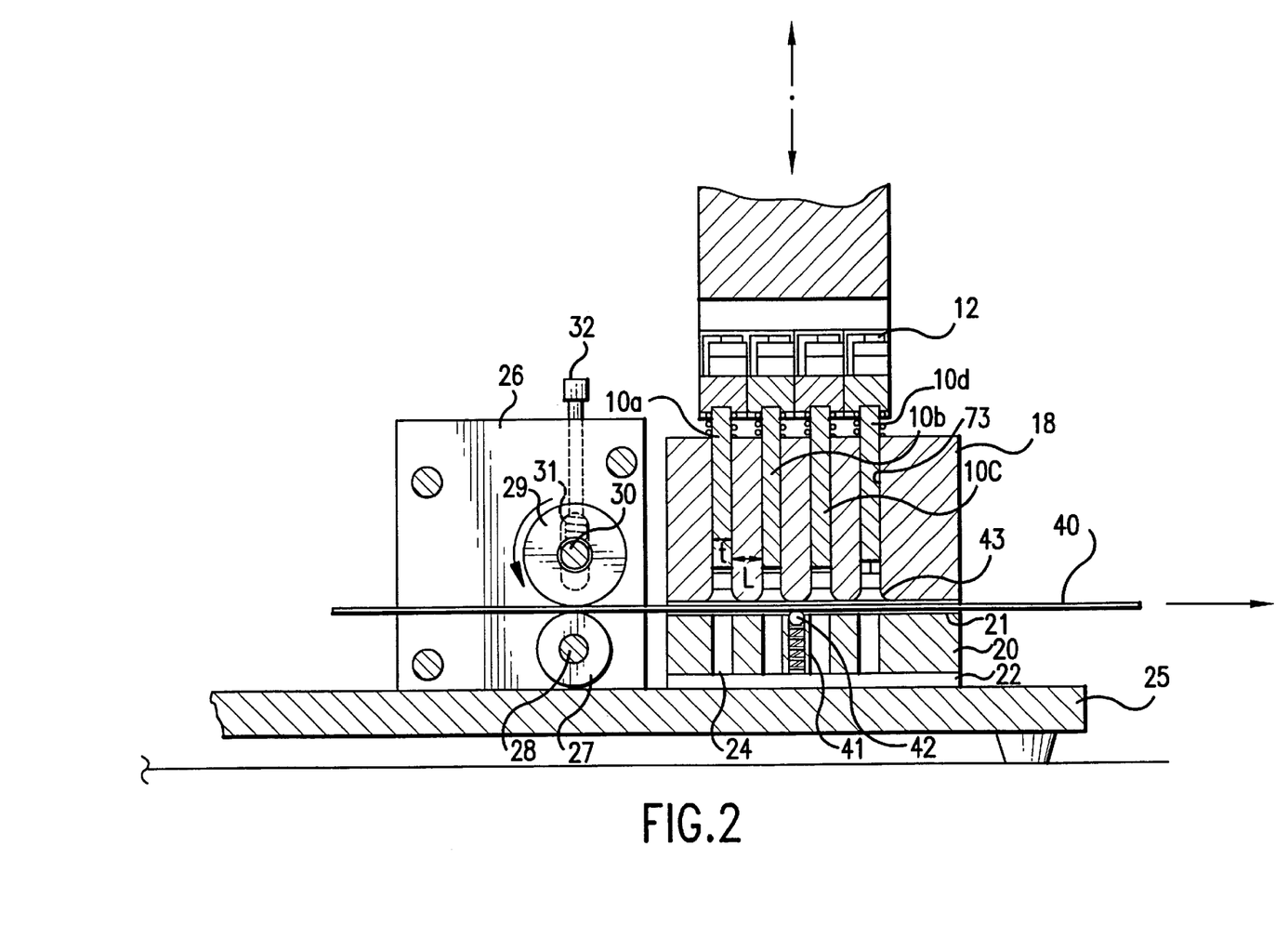
FIG. 2 is a cross sectional view taken along I—I lne of FIG. 1.

FIG. 1 is a front elevational view, and FIG. 2 is a cross sectional view taken along I—I line of FIG. 1. As can be seen from FIG. 1, the cutting apparatus of the invention includes an air cylinder 1 controllably driven through two alternative compressed air inlet and outlet tubes 2, 3, and an arbor 6 for executing a pressing operation by perpendicularly moving to up and down direction by the air cylinder 1. The arbor 6 is ensured with a stable linear movement by an arbor guiding member 7, and a bottom front end portion of the arbor 6 serves as a pressing means 8 for pressing a cutter assembly which will be described hereinafter.

Figure 3:
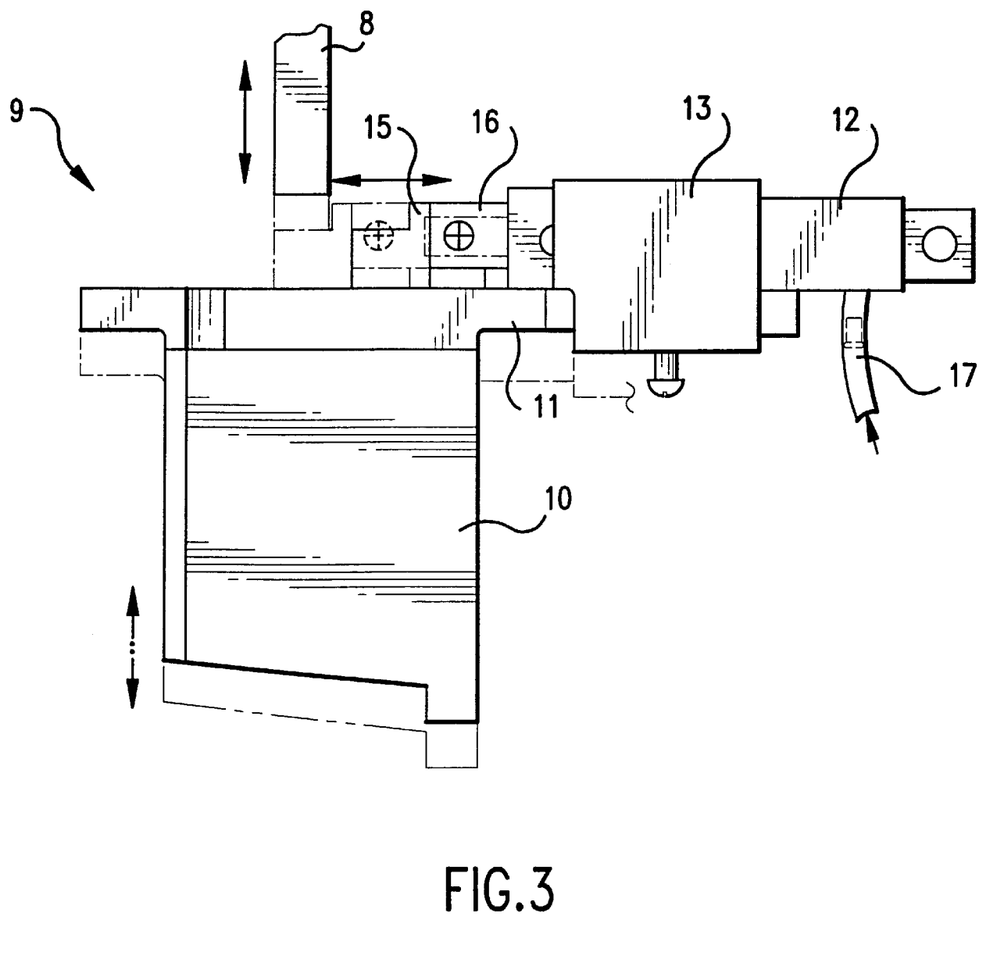

To a lower portion of the pressing means 8 of the arbor 6 there is provided with four cutter assemblies 9 within its width region(refer to FIG. 2). Each cutter assembly 9 includes a cutter section 10, cutter supporting section 11, one way air cylinder 12, cylinder fixing means 13, and hydraulic pressure member 15(refer to FIG. 3). The cutter supporting section 11 for fixedly supporting the cutter section 10 is supported on a cutter guiding member 18 through a compression spring 19.

The air cylinder 12 fixed by the fixing means on the cutter supporting section 11 is driven by a compressed air fed through a compressed air tube 17, and it makes a hydraulic member 15 connected to its push rod 16 to forwardly and reversely slide horizontally on the cutter supporting section 11. The air cylinder 12 drives the hydraulic pressure member 15 to advancing direction by the compressed air (the dots chain line of FIG. 1), and when a feeding of the compressed air is removed, the hydraulic pressure member 15 is returned by the spring contained within the cylinder 12.

Figure 4:
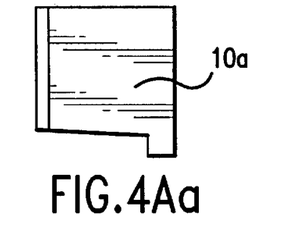

Those which show as examples the kinds of cutters capable of applying in the blade's raw material cutting apparatus of the present invention and shapes of the blade's raw material cut by them are FIG. 4. A cutter 10a of FIG. 4(A) is a so-called lip cutting cutter, and a cross sectional view of the blade's raw material 40 cut by this is remained by protruding in lip form with the blade portion of the blade's raw material 40 as shown. A cutter 10b of FIG. 4(B) is a straight line cutter, and it cuts the blade's raw material 40 in staight line whereby its cut surface has a linear form. A cutter 10c of FIG. 4(C) is a bridge cutter which cuts off with remaining a part of width of the blade's raw material 40 in a bridge form. This bridge cutter 10c partially cuts the blade such that the blade can be set on the board where the pierced groove is not provided for keeping a predetermined strength of board's base plate fixedly supporting the blade 40.

And, a cutter 10d of FIG. 4(D) is a marking cutter of a bending position which is newly applied in the cutting apparatus of the present invention. Heretofore, an operator has directly measured a position to bend, and on the basis of this, he has adjusted a stopper by a vernier calipers and the like attached to a bending machine, and aligned a front portion of the blade's raw material to the stopper and then executed the bending work. This marking cutter 10d is a thing for solving the inconvenience in the conventional bending machine, and which makes a bending position setting of the blade's raw material to be easily done by cutting off an edge potion of the blade's raw material 40 with a small depth and by executing the bending work by aligning this cut off portion to a corresponding protruded portion provided in the bending machine. In order to reduce a risk, such as abrasion loss capable of arising due to such cutting blade portion of the marking cutter 10d is sharply fromed, as shown in FIG. 4(E), a marking cutter 10e which eliminated away the sharp portion by rounding the tip end portion can be used.

A notch cutter 10f of FIG. 4(F) serves to reduce a bending force in the bending machine, other than to execute also a bending position indicating function as similar as the marking cutters 10d and 10e of FIGS.(D) and (E). Accordingly, for a place which is difficult to work by a bending die having a sufficient strength, for example, when a space for operation of the bending die by a complicated bending shape is narrow, a thin and long notch is formed by this notching cutter 10f and thereafter the bending work can be carried out by using a small bending die relatively lower in strength.

The cutter guiding member 18 accomodates as may be seen from FIG. 1 and FIG. 2 each cutter section 10 of four cutter assemblies 9 laterally disposed side by side against a feeding direction of the blade's raw material 40 to be worked by cutting so as to be able to move in perpendicular direction. For this purpose, the cutter guiding member 18 has guiding holes 23 as much as an amount corresponding to the number of cutters.

To a lower portion of the cutter guiding member 18 there is provided on a base board 25 with a cutter die 20 which supports the cutter guiding member 18 and for executing a cutting out or cutting off work of the blade's raw material by interacting with the cutter section 10 of the cutter assembly 9. The cutter die 20 has holes 24 having a cross sectional pattern corresponding to the cutter shape so as to accomodate a part of a front end portion of the cutter section 10 in a time of cutting work for the interaction with the cutter section 10 (refer to FIG. 2). The cutter die 20 includes a blade's raw material guiding groove 21 for guiding a conveyance of the blade's raw material 40 at its upper portion, and it is formed with a chip receiving portion 22 capable of collecting the cut blade's raw material chips at its lower portion.

On the other hand, as may be seen from FIG. 2, a blade's raw material feeding section is provided side by side with a cutting work section of the blade's raw material 40 consisted of the cutter guiding section 18 and the cutter die 20. The blade's raw material feeding section includes feeding roller 27 driven by a driving motor which is not shown, a pressing roller 29 for pressing the feeding roller 27 by placing the blade's raw material 40 between them to be worked by cutting, and a supporting walls 26 for supporting said two rollers 27,29 at both sides.

The feeding roller 27 receives a rotating power from the driving motor through its rotary shaft 28 and feeds the blade's raw material 40 to its advancing direction by a rotating frictional force with the blade's raw material. The frictional force between the blade's raw material 40 and the feeding foller 27 is provided by the pressing roller 29 located at a upper portion of the feeding roller 27. The pressing roller 29 is mounted so as to be freely rotatable around a rotary shaft 30 rotatably fixed to the supporting walls 26. And, the rotary shaft 30 of the pressing roller 29 is resiliently urged to downward by a compression spring 31 and a compression spring adjusting screw 32, and the pressing roller 29 presses the feeding roller 27 and the blade's raw material 40 by this urging force.

A feeding quantity of the blade's raw material 40 can be automatically and precisely controlled by a rotating quantity of the feeding roller 27 through the driving motor of the feeding roller 27. Otherwise, it is of course possible also either to handle the feeding roller by manually rotating or to manually feed without passing through the feeding roller 27. In case of this manual feeding, a blade's raw material cutting position determining means having a vernier calipers and the like as in the conventional cutting apparatus should be provided so as to exactly specify with regard to the different working positions of each cutter 10a, 10b, 10c, and 10d.

The blade's raw material cutting apparatus of the present invention having these construction operates as follows. Firstly, a cutting pattern to be executed to the blade's raw material 40, that is, the kind of cutter and its position are determined. In case of an embodiment shown, since four kinds of cutters as shown in FIG. 4 are provided, firstly any one of these is selected. When a kind of cutter is selected, a feeding quantity of the blade's raw material 40 is determined automatically or by an appropriate calculation in relation to a cutting position by considering a relative working position of the cutter against an advancing direction of the blade's raw material. According to this, the blade's raw material 40 is conveyed by either pertinently driving the driving motor of the feeding roller 27 or by directly manually, and feeds a compressed air to the air cylinder 12 provided to a corresponding cutter. Then, the hydraulic pressure member 15 connected to the push rod 16 of the cylinder 12 moves by sliding to an advancing direction whereby becomes to be located to immediately under the pressing section 8 attached to the arbor 6 of the pressing air cylinder 1. Simultaneously with this, the pressing section descends when the pressing air cylinder 1 is driven by the compressed air, said hydraulic pressure member 15 is pressed, and the hydraulic pressure member 15 transfers its pressing force to a corresponding cutter section 10, and the cutter section 10 descended by following the guiding hole 23 of the guiding member 18 in accordance with that becomes to cut the blade's raw material 40 which resides between them to a predetermined pattern.

The blade's raw material 40 which has completed a primary cutting work by doing like this further advances in measuring way by the feeding roller 27 as aforementioned manner whereby a desired secondary cutting work is carried out at a predetermined location. By repeating these processes, the cutting work of various cutting patterns can be continuously carried out.

Figure 5:
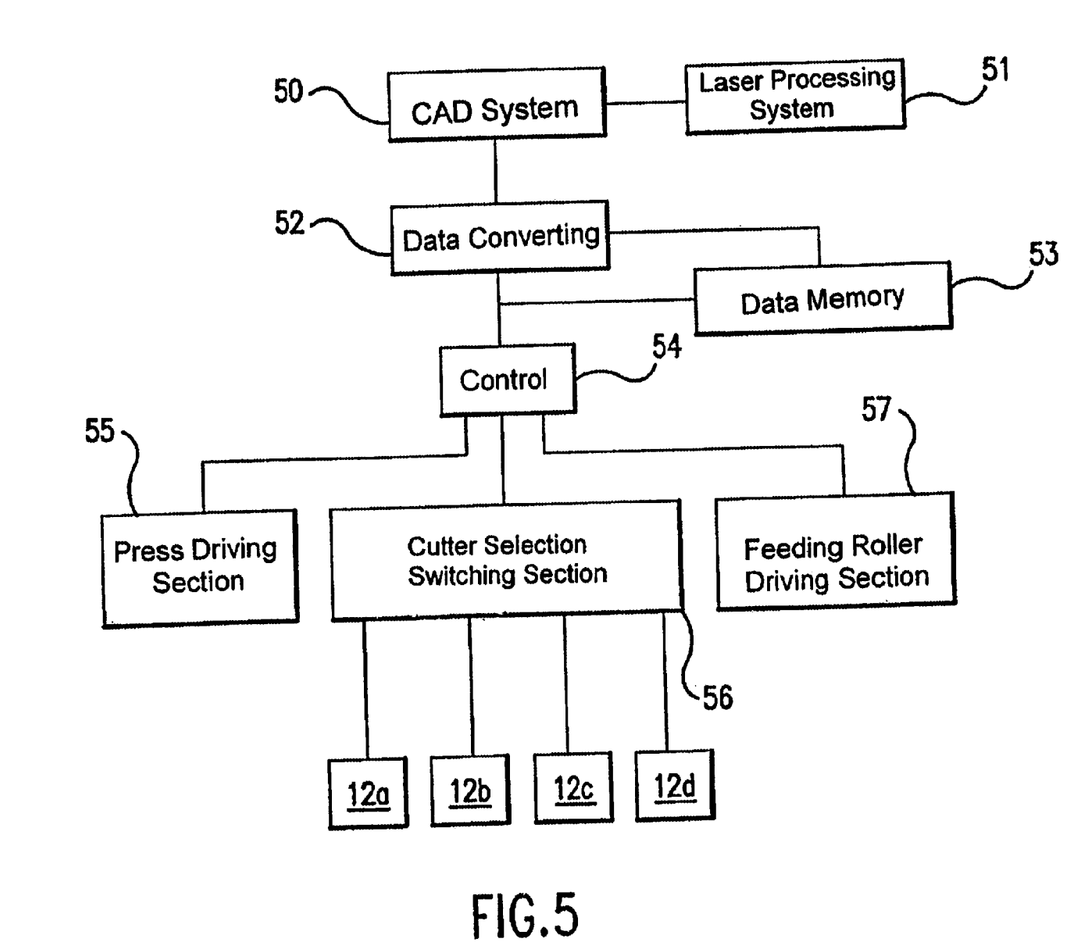
FIG. 5 is a block diagram of manufacturing process of an automatic cutting system in accordacne with the present invention, and FIG. 6a are diagrams of a practical example for illustrating a working process of the automatic cutting system of this invention, which show an offered CAD data FIG. 6(a) and a shape of the blade's raw material FIG. 6(b) worked by cutting on the basis of it.

FIG. 5 shows a control system for automatically executing the work of aforementioned cutting apparatus in a block diagram. In the illustrated embodiment, the data of CAD system utilized for the automatic laser process forming the pierced groove of the blanking die is utilized as automatic control data of this blade's raw material cutting system. The data of CAD system 50 which has made an outline drawing on a desired plane pattern is fed to a laser processing system 51 for the pierced groove working of the blanking die, and simultaneously it is fed also to a data converting section 52 for a cutting work of the blade's raw material 40.

The data converting section 52 converts the two dimentional data in the CAD system 50 into one dimensional data for a linear cutting work of the blade's raw material 40. Accordingly, the kind of the cutter and the cutting position to be applied to the blade's raw material 40 are exactly determined from the CAD data. For this purpose, it is reflected to a conveying quantity of the blade's raw material by judging collectively a relative position of the cutters which are arranged side by side for this and a working position of the cutter considered the rounding quantity in case where a bending process is included.

As in the embodiment illustrated in FIG. 1 and FIG. 2, in case of including a marking cutter for indicating a bending position, a position to be bent with the blade's raw material 40 is indicated by notching and thereby a post working at the bending machine can be easily carried out. By the way, in a time of bending work of the blade's raw material, a difference would be occurred between a calculated size and a practical size due to a working transformation of the blade's raw material. This dimensional difference varies in accordance with an expansion rate of the material, a bending angle and a rounding quantity etc., and it has to be necessarily considered not only for exactly specifying the bending position of the blade's raw material but also for making the cutting work position thereafter to be exactly aligned.

Accordingly, in the present invention, a data memory 53 is included which stores a material property such as a previously provided expansion rate by considering various bending conditions, so as to be able to pertinently compensate the marking position and the cutting or bending positoion of the bending work portion to be notched by the marking cutter on the basis of the expanded quantity of the material in accordance with the bending work condition. The data memory 53 is combined with the cutting work data from the data converting section 52 and fed to the control section 54.

The control section 54 controls the cutting apparatus and the blade's raw material feeding section on the basis of the cutting work data from the data converting section 52 and the material property memory 53. It controls a feeding roller driving section 57 for driving in measuring way the blade's raw material feeding roller 27 in accordance with the calculated and compensated data, and controls an air cylinder switching section 56 for feeding a compressed air to the air cylinder 12 of the cutter selected in accordance with the cutter selecting data to a conveyed blade's raw material. And, it makes the blade's raw material to be conveyed to a predetermined position and a pressure applying press driving section 55 to be controlled in a state that a cutter is selected, so that the cutting work can be made.

Figure 6A:
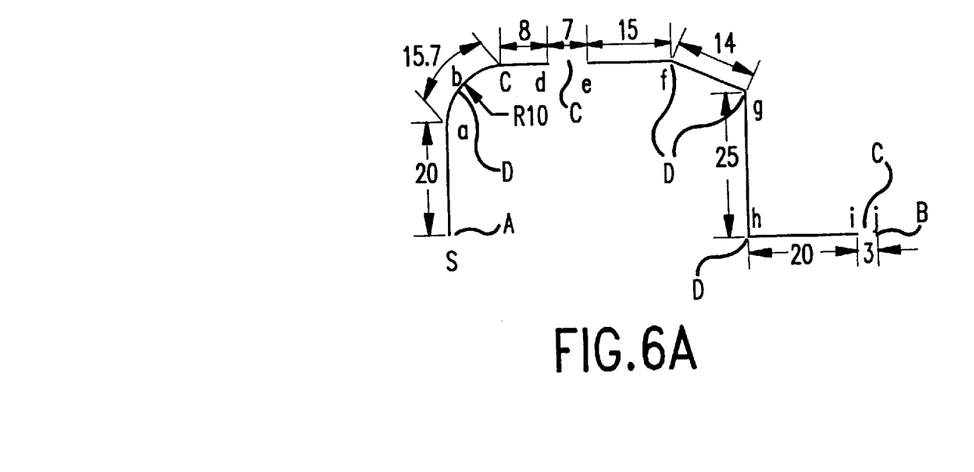
Figure 6B:
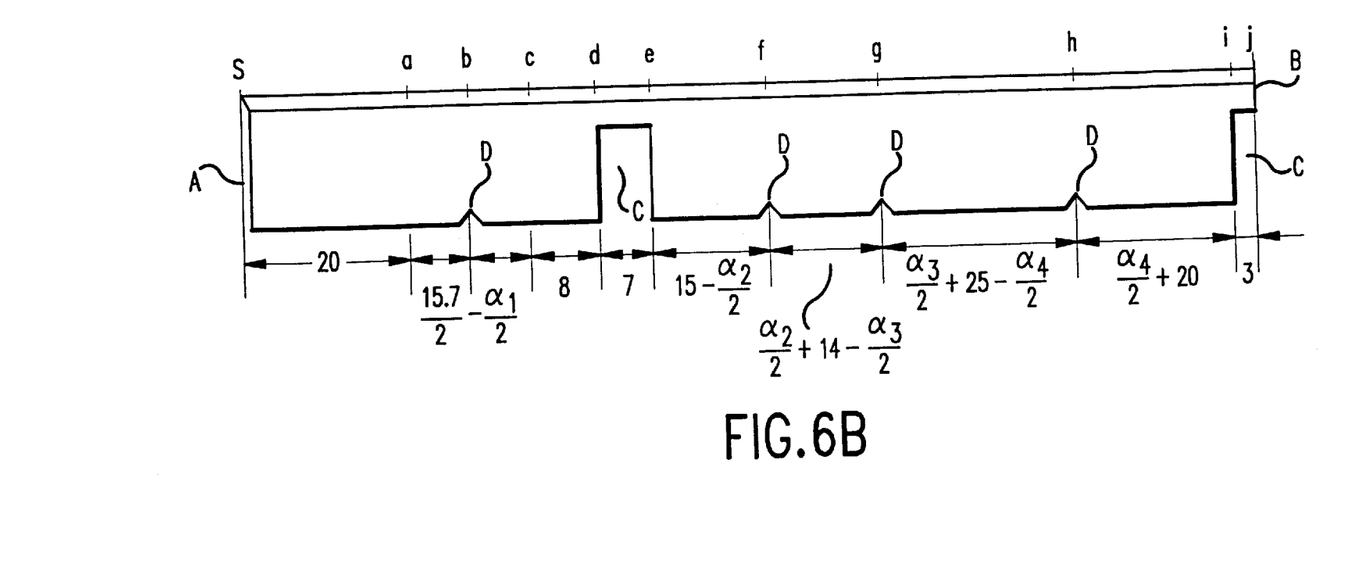

The working process in this automatic cutting system will be described by citing a practical example as shown in FIG. 6.

FIG. 6(a) is two dimensional data for a laser process made at CAD system 50. A cutting process at the cutting apparatus continuously advances by starting from s point through a to j points, and A,B,C, and D indicates respectively a lip cutter 10a, staight line cutter 10b, bridge cutter 10c, and marking cutter 10d.

The initially fed blade's raw material is firstly worked bt a lip cutting process(A) by the lip cutter 10a designated as an initial cutter in a processing data in accordance with the control of the control section 54. Successively, a marking cutter process at b point which is an intermediate point of the bending portion for indicating a 90 degree bending portion of R10 is executed to the blade's raw material which has lip cutting processed. A moved position of b point against s point is determined as $(20+15.7/2-\alpha_1/2)$ by summing a distance between s~a and a~b and compensating a material expansion rate$(\alpha_1)$ by a corresponding bending process. And, since the lip cutter 10a and the marking cutter 10d are distanced away with a predetermined distance, this should also be considered. Assuming that thickness of each cutter is uniformly t and gap between the cutters is also uniformly 1, a distance that the blade's raw material has to be actually moved for the marking at b point becomes $(20+15.7/2-\alpha_1/2+3.5t+31-\beta)$ when considering a protruded quantity $\beta$ of the lip. The blade's raw material which has moved in measuring way said distance by the blade's raw material feeding section 56 is cut off as FIG. 5(b) at b point position, as the air cylinder 12d is driven by the cutter selection switching section 56 and simultaneously with this the pressure applying press driving section 55 operates whereby presses the marking cutter 10d.

In accordance with the calculating process as similar as above, the blade's raw material moves again by $(15.7/2+\beta+7-\alpha_1/2)-(1.5+1)$, and the bridge cutting(C) is executed by the bridge cutter 10c at said position.

The control section 54, with repeating the process as above, pertinently controls the blade's raw material feeding roller driving section 57, the cutter selecting air cylinder switching section 56, and the pressure applying press driving section 55, so that the corresponding cutting work can be made at an exact position. And, in relation to the relative position of each cutters 12a, 12b, 12c and 12d and their working position, the working position and time point are appropriately arranged sequentially so as not to have a necessity to make the blade's raw material to be reversely moved.

The cutting work is sequentially progressed in accordance with the control of the control section 54, and finally it terminates by the straight line cutting(B). The cutting process works of all the blade's raw material are started and terminated by the lip cutter 10a or the straight line cutter 10b. When one time cutting work is completed, the control section repeats same work as much as a required number of quantity on the basis of inputted data.

In the embodiment shown and described before, a single press device is used for the pressing of the cutters, and the air cylinder attached to each cutter used as the cutter selecting means is selectively switched and driven whereby the cutting work is executed, but it is possible to progress the desired cutting work by attaching respectively an independent press device to each cutter and driving by switching selectively these press devices.

And, the air cylinder is used by attaching to each cutter as a cutter selecting means, but a mechanically controlled lever type link mechanism or an electromagnetically controllable solenoid device and the like can be utilized.

INDUSTRIAL APPLICABILITY

As described above, since the blade's raw material in accordance with the present invention includes various cutting pattern cutters in a single equipment and these are selectively used so that various cutting works of the blade's raw material continuously fed can be continuously executed, it provides various effects such as an improvement of workability, a reducing of necessary equipment number, a space saving and etc. Besides, a laser processing of the board and the cutting work of the blade's raw material can be simultaneously progressed by utilizing CAD data and the like by the blade's raw material automatic cutting system including this cutting apparatus, and an excellent effect that the cutting work can be completely automatized can be obtanined. And, in case of including a marking cutter for the bending process, since a transformation expanding rate of the material is pertinently compensated whereby the cutting out and cutting off works are executed to the exact positon and a notch for indicating the bending position is formed, not only it makes the bending work to enable to be easily and precisely carried out, but also the material loss can be reduced by efficiently utilizing the material.

I claim:

1. A storage medium having stored codes readable by a processor for executing method steps for cutting a metallic rule, the method comprising the steps of:

storing in a memory associated with a control unit data specifying lengths of said rule to be advanced and types of cut to be made at said lengths;

advancing said rule along a longitudinal axis under control of said control unit through a plurality of cutters, said plurality of cutters arranged laterally along said longitudinal axis and having at least one of a lip shape cutter and a marker cutter;

accessing said data stored in said memory by said control unit; and cutting said rule with said types of cut at said specified lengths of said rule by causing cutters corresponding to said types of cut to impact said rule from a direction transverse to said longitudinal axis under control of said control unit.

2. The method of cutting as in claim 1, further including the step of disposing a cutter die opposite said cutters for supporting the metallic rule against the pressing force of said cutters impacting said rule.

3. The method of cuffing as in claim 1, further including the step of inputting expansion coefficient data in said memory and compensating said lengths of said rule to be advanced in accordance to said expansion coefficient data.

4. The method of cutting as in claim 1, wherein said plurality of cutters are in a pattern to cut any combination of lip, bridge, marker, and straight cuts.

* * * * *